United States Patent
Stenneth et al.

(10) Patent No.: US 10,311,728 B2
(45) Date of Patent: Jun. 4, 2019

(54) METHOD AND APPARATUS FOR PROVIDING A CONFIDENCE-BASED ROAD EVENT MESSAGE

(71) Applicant: HERE GLOBAL B.V., Eindhoven (NL)

(72) Inventors: Leon Stenneth, Chicago, IL (US); Alex Averbuch, Buffalo Grove, IL (US); Gavril Giurgiu, Deerfield, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/675,405

(22) Filed: Aug. 11, 2017

(65) Prior Publication Data
US 2019/0051172 A1 Feb. 14, 2019

(51) Int. Cl.
G08G 1/09 (2006.01)
G08G 1/0967 (2006.01)
G01C 21/36 (2006.01)
G01W 1/06 (2006.01)
H04L 29/08 (2006.01)

(52) U.S. Cl.
CPC ... G08G 1/096791 (2013.01); G01C 21/3697 (2013.01); G01W 1/06 (2013.01); H04L 67/12 (2013.01)

(58) Field of Classification Search
CPC ........ G08G 1/096791; G01C 21/3697; G01W 1/06; H04L 67/12
USPC .......................................................... 340/905
See application file for complete search history.

(56) References Cited

U.S. PATENT DOCUMENTS

| 5,261,503 | A | * | 11/1993 | Yasui | B62D 5/22 180/197 |
| 5,802,492 | A | * | 9/1998 | DeLorme | G01C 21/3476 340/990 |
| 8,520,695 | B1 | * | 8/2013 | Rubin | G08G 9/02 370/445 |
| 8,744,822 | B2 | | 6/2014 | Mewes et al. | |

(Continued)

FOREIGN PATENT DOCUMENTS

WO 2017053357 A1 3/2017

OTHER PUBLICATIONS

Petty et al., "Enhancing Road Weather Information Through Vehicle Infrastructure Integration", Transportation Research Record: Journal of the Transportation Research Board No. 2015, Dec. 2007, 17 Pages.

(Continued)

*Primary Examiner* — Naomi J Small
(74) *Attorney, Agent, or Firm* — Ditthavong & Steiner, P.C.

(57) ABSTRACT

An approach is provided for a confidence-based road event message. For example, the approach involves aggregating road event reports (e.g., slippery road event reports) from vehicles traveling in an area of interest. The approach also involves retrieving weather data records for the area of interest for a time period corresponding to the reports. The approach may further involve determining a data freshness parameter based on an age of the reports, and a number of vehicle generating the reports. The approach further involves calculating a confidence level for the road event based on the weather data records, data freshness parameter, number of the one or more vehicles, or a combination thereof.

20 Claims, 10 Drawing Sheets

(56) References Cited

U.S. PATENT DOCUMENTS

| | | | |
|---|---|---|---|
| 8,831,869 B2 | 9/2014 | Bai et al. | |
| 9,030,336 B2* | 5/2015 | Doyle | G01W 1/00 340/539.1 |
| 9,361,797 B1* | 6/2016 | Chen | G08G 1/0112 |
| 9,818,136 B1* | 11/2017 | Hoffberg | G06Q 30/0207 |
| 2007/0087756 A1* | 4/2007 | Hoffberg | G06Q 10/0631 455/450 |
| 2008/0002721 A1* | 1/2008 | Greene | H04L 12/189 370/400 |
| 2008/0071465 A1* | 3/2008 | Chapman | G01C 21/3691 701/117 |
| 2008/0252484 A1* | 10/2008 | Hopkins | G01C 21/26 340/905 |
| 2009/0080973 A1 | 3/2009 | Bespalov et al. | |
| 2011/0296185 A1* | 12/2011 | Kamarthy | H04L 63/1441 713/171 |
| 2012/0158820 A1* | 6/2012 | Bai | G07C 5/008 709/202 |
| 2013/0147846 A1* | 6/2013 | Kalai | G06T 1/60 345/660 |
| 2013/0154854 A1* | 6/2013 | Chen | G08G 1/096741 340/905 |
| 2014/0006531 A1* | 1/2014 | Sakiyama | H04L 51/00 709/206 |
| 2014/0067265 A1 | 3/2014 | Maston | |
| 2014/0094989 A1* | 4/2014 | Dadu | G08G 1/0962 701/1 |
| 2014/0141803 A1* | 5/2014 | Marti | H04W 4/043 455/456.2 |
| 2014/0160295 A1 | 6/2014 | Kyomitsu et al. | |
| 2014/0303806 A1 | 10/2014 | Bai et al. | |
| 2015/0018027 A1* | 1/2015 | Noh | H04W 56/001 455/502 |
| 2015/0112579 A1* | 4/2015 | Finnis | G08G 1/0962 701/117 |
| 2015/0254986 A1 | 9/2015 | Fairfield et al. | |
| 2016/0042239 A1* | 2/2016 | Fowe | G06T 7/20 382/104 |
| 2016/0176408 A1* | 6/2016 | Lynch | B60W 40/064 701/23 |
| 2017/0006531 A1* | 1/2017 | Jung | H04W 48/16 |
| 2017/0132929 A1 | 5/2017 | Mays et al. | |
| 2017/0168495 A1 | 6/2017 | Wood et al. | |
| 2017/0168500 A1* | 6/2017 | Bradley | G07C 5/02 |
| 2017/0229011 A1* | 8/2017 | Basir | G08G 1/0104 |
| 2017/0241778 A1* | 8/2017 | Hanatsuka | B60T 8/172 |
| 2017/0243485 A1* | 8/2017 | Rubin | H04W 72/005 |
| 2017/0249844 A1* | 8/2017 | Perkins | B60W 50/0097 |
| 2017/0291615 A1* | 10/2017 | Kusano | B60W 50/14 |

OTHER PUBLICATIONS

Office Action for related European Patent Application No. 18186167.5-1203, dated Jan. 18, 2019, 16 pages.

* cited by examiner

METHOD AND APPARATUS FOR PROVIDING A CONFIDENCE-BASED ROAD EVENT MESSAGE

BACKGROUND

Modern vehicles are capable of generating and reporting an increasing amount of sensor data from which various road-related events (e.g., slippery road events, precipitation events, visibility events, etc.) can be detected. However, with the potential number of connected vehicles expected to grow into the millions, service providers face significant technical challenges to efficiently process vehicle-reported sensor data to determine whether to report or otherwise act on any road events detected from the sensor data.

SOME EXAMPLE EMBODIMENTS

Therefore, there is need for a confidence-based approach to processing vehicle sensor data to detect road events (e.g., slippery road event) and then to transmit or act on corresponding road event messages.

According to one embodiment, a computer-implemented method comprises aggregating one or more reports of a road event reported from one or more vehicles traveling in an area of interest. The method also comprises retrieving weather data records for the area of interest for a time period corresponding to the one or more reports. The method further comprises calculating a data freshness parameter for the one or more reports based on an age of each of the one or more reports. The method further comprises determining a number of the one or more vehicles generating the one or more reports. The method further comprises calculating a confidence level for the road event based on the weather data records, the data freshness parameter, the number of the one or more vehicles, or a combination thereof. The method further comprises transmitting a road event message for the area of interest based on the confidence level. In addition or alternatively to the transmitting of the road event message, the method may comprise configuring an autonomous function of a vehicle based on the confidence level.

According to another embodiment, an apparatus comprises at least one processor, and at least one memory including computer program code for one or more programs, the at least one memory and the computer program code configured to, with the at least one processor, to cause, at least in part, the apparatus to aggregate one or more reports of a road event reported from one or more vehicles traveling in an area of interest. The apparatus is also caused to retrieve weather data records for the area of interest for a time period corresponding to the one or more reports. The apparatus is further caused to calculate a data freshness parameter for the one or more reports based on an age of each of the one or more reports. The apparatus is further caused to determine a number of the one or more vehicles generating the one or more reports. The apparatus is further caused to calculate a confidence level for the road event based on the weather data records, the data freshness parameter, the number of the one or more vehicles, or a combination thereof. The apparatus is further caused to transmit a road event message for the area of interest based on the confidence level. In addition or alternatively to the transmitting of the road event message, the apparatus may be caused to configure an autonomous function of a vehicle based on the confidence level.

According to another embodiment, a computer-readable storage medium carrying one or more sequences of one or more instructions which, when executed by one or more processors, cause, at least in part, an apparatus to aggregate one or more reports of a road event reported from one or more vehicles traveling in an area of interest. The apparatus is also caused to retrieve weather data records for the area of interest for a time period corresponding to the one or more reports. The apparatus is further caused to calculate a data freshness parameter for the one or more reports based on an age of each of the one or more reports. The apparatus is further caused to determine a number of the one or more vehicles generating the one or more reports. The apparatus is further caused to calculate a confidence level for the road event based on the weather data records, the data freshness parameter, the number of the one or more vehicles, or a combination thereof. The apparatus is further caused to transmit a road event message for the area of interest based on the confidence level. In addition or alternatively to the transmitting of the road event message, the apparatus may be caused to configure an autonomous function of a vehicle based on the confidence level.

According to another embodiment, an apparatus comprises means for aggregating one or more reports of a road event reported from one or more vehicles traveling in an area of interest. The apparatus also comprises means for retrieving weather data records for the area of interest for a time period corresponding to the one or more reports. The apparatus further comprises means for calculating a data freshness parameter for the one or more reports based on an age of each of the one or more reports. The apparatus further comprises means for determining a number of the one or more vehicles generating the one or more reports. The apparatus further comprises means for calculating a confidence level for the road event based on the weather data records, the data freshness parameter, the number of the one or more vehicles, or a combination thereof. The apparatus further comprises means for transmitting a road event message for the area of interest based on the confidence level. In addition or alternatively to the means for transmitting of the road event message, the apparatus may comprise means for configuring an autonomous function of a vehicle based on the confidence level.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a confidence-based road event message are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
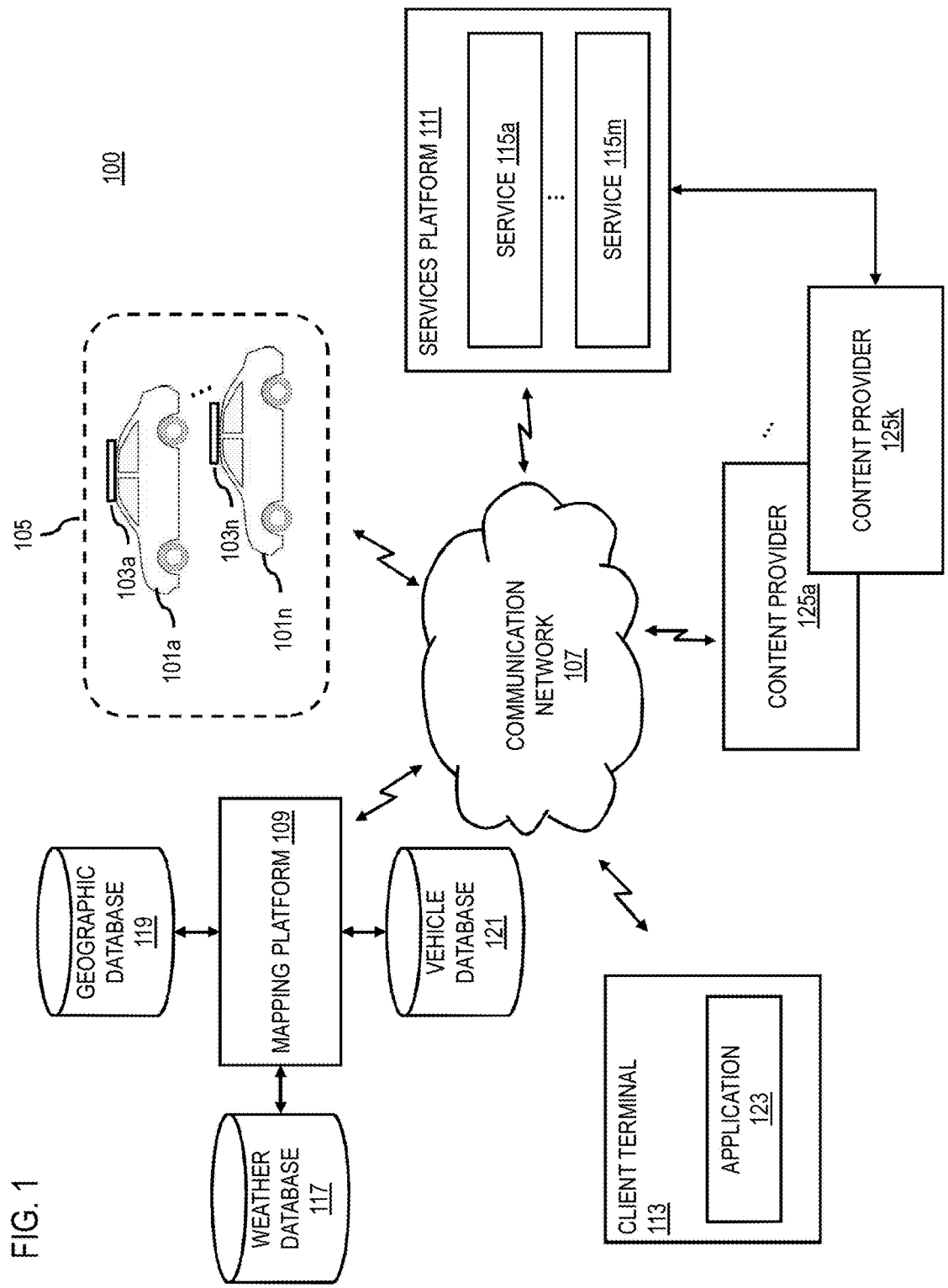
FIG. 1 is a diagram of a system capable of providing a confidence-based road event message, according to one embodiment.

FIG. 1 is a diagram of a system capable of providing a confidence-based road event message, according to one embodiment. In one embodiment, the system 100 comprises one or more vehicles 101a-101n (also collectively referred to as vehicles 101) respectively equipped with sensors 103a-103n (also collectively referred to as sensors 103) for sensing vehicle telemetry data (e.g., speed, heading, acceleration, lateral acceleration, braking force, wheel speed, etc.), road conditions, environmental conditions (e.g., weather, lighting, etc.), and/or other characteristics of an area of interest 105 of a transportation network (e.g., a road network) in which the vehicles 101 are traveling. The vehicles 101 (e.g., "connected vehicles") are also equipped with communications capability (e.g., a wireless communications device configured to transmit sensor data over a communication network 107 to a mapping platform 109 and/or the services platform 111, such as a client terminal 113 or other equivalent embedded system).

Service providers and vehicle manufacturers are increasingly interested in developing accurate location-based services and navigation services that improve the overall driving experience by leveraging the sensor data collected by these connected vehicles 101 as they travel. Similarly, the effectiveness of the data relied upon by the location-based service and/or navigation service directly impacts the ability of a vehicle (particularly an autonomous vehicle) to operate effectively. For example, autonomous vehicles typically employ onboard navigations systems for interacting with a global positioning service, mapping service or the like to receive relevant location information, driving instructions, traffic information and other data for supporting independent navigation of the vehicle. In addition, the vehicles may rely on various sensors for perceiving its environment, including presence and/or proximity sensors, weather and road condition sensors, speed detection sensors, light intensity sensors, tire traction sensors etc. Based on this data, the vehicle may execute various actions (e.g., change operation mode from autonomous to manual or vice versa, initiate a turn, accelerate, brake) relative to the travel path upon which it is navigating.

Generally, the map data provided to autonomous and other vehicles include incident reports indicating road events related to the road segment being traveled. For example, an incident report may indicate that the particular road segment is slippery and therefore dangerous to drive. The slippery condition of a road is typically due to low friction of the road surface. The low friction road conditions may depend on many factors such as weather, temperature, humidity, road surface type, road surface quality, vehicle conditions, tires, etc. These incident or road event reports are typically generated based on information provided by multiple vehicles under different driving (e.g., speed, dimensions, weight of vehicle, time, etc.) and environmental conditions (e.g., weather conditions). These differences can affect the reliability of the reported road events including slippery road events. Other examples of road events include, but are not limited to visibility events indicating reduced visibility from the vehicle 101 to the surrounding area; precipitation events that may also result, for instance, in slippery road conditions and/or reduced visibility; and/or the like.

Historically, service providers (e.g., via the mapping platform 109, the services platform 111, and/or one or more services 115a-115m of the services platform 111—also collectively referred to as services 115) have aggregated incident/road event reports (e.g., each report comprising sensor data in addition to a location and time the data was sensed by the vehicle 101). By way of example, the service providers aggregate the reports to generate and transmit road event messages to alert end users of any detected road event (e.g., a slippery road event). This aggregation and processing generally occurs in near real-time in predetermined time epochs (e.g., 15-30 minute time epochs). In other words, the vehicle sensor data reports are aggregated into bins according to a distance threshold and a time window (e.g., the time epoch). For example, if reports indicating a road event are received within the current time epoch under evaluation, then the service provider can transmit a message indicating the road event (e.g., over a Radio Data System-Traffic Message Channel (RDS-TMC) or equivalent system).

However, under this traditional approach, service providers transmit road event messages without generally assessing a confidence level for the reported road event. As noted above, the vehicles 101 and/or sensors 103 used to generate incident/road event reports can be highly variable because of different makes, models, sensor types, etc. This variability can lead to a greater potential for reporting false positives of road events. For example, in the context of a slippery road event, a false positive would be transmitting a message indicating that reported sensor data indicate that a particular road segment has slippery conditions when the ground truth is that the road segment does not have slippery conditions. Accordingly, service providers face significant technical challenges to assess the confidence level associated a reported road event, particularly with respect to identifying and retrieving what additional data are needed to calculate the confidence level in real-time or near real-time. This technical challenge is increased with the additional data for assessing confidence is resident on separate or external servers or database.

To address this problem, the system 100 of FIG. 1 introduces a capability to enhance the detection of a road event (e.g., slippery road events) from vehicle sensor reports of the road event. In one embodiment, the system 100 performs this enhancement by fusing external data sources (e.g., external with respect to the mapping platform 109 or other component of the system 100 that is aggregating the vehicle reports) with the sensor data reports to calculate a confidence level for the associated road event. As shown, examples of these data sources include, but are not limited, to a weather database 117 storing weather data records for locations corresponding to the vehicle sensor data reports, a geographic database 119 for storing mapping data records representing the locations of the detected road events and/or the vehicle sensor data reports, and a vehicle database 121 storing vehicle specification data records indicating a respective quality of the sensor data reports generated by a given vehicle 101.

Figure 2:
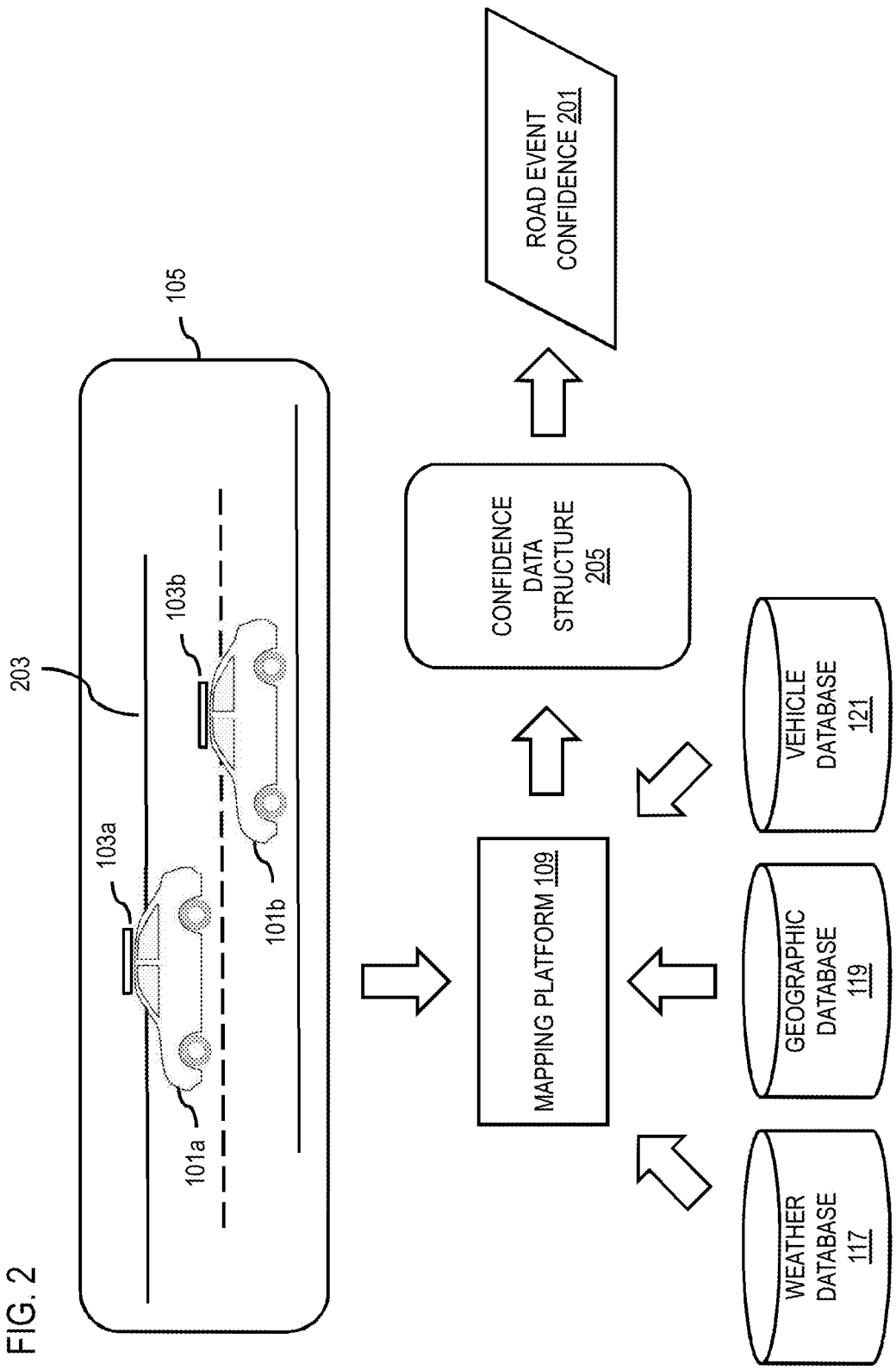
FIG. 2 is a diagram illustrating an example of using the system of FIG. 1 to output a road event confidence, according to one embodiment.

FIG. 2 is a diagram illustrating an example of using the system 100 of FIG. 1 to output a road event confidence level 201, according to one embodiment. As shown in FIG. 2, the mapping platform 109 aggregates vehicle sensor data reports of a road event from the vehicle 101a equipped with sensors 103a and the vehicle 101b equipped with sensors 103b as the vehicles 101a and 101b travel on a road segment 203 within the area of interest 105. In one embodiment, the aggregation results in grouping the vehicle sensors data reports under the road event to which the data relate.

In one embodiment, the mapping platform 109 can account for a variety of factors that characterize the reported vehicle sensor data, the reporting vehicles 101a and/or 101b, the road segment 203, and/or the area of interest 105 when calculating a confidence level for the road event associated with the vehicle sensor data reports. By way of example, these factors include, but are not limited to: (1) weather data records from external sources or sources other than the vehicles 101; (2) sensor data freshness (e.g., more recent data will result in higher confidence); (3) the quality of the sources of the sensor data (e.g., quality of the vehicles 101 and/or the sensors 103); and/or (4) the number of vehicles 101 reporting the same road event (e.g., more vehicles 101 reporting the same road event will result in higher confidence of the event).

In one embodiment, the mapping platform 109 fuses data from data sources such as the weather database 117, the geographic database 119, the vehicle database 121, and/or the like with the aggregated vehicle sensor data reports to create a confidence data structure 205 or equivalent data record. The confidence data structure 205 includes, for instance, at least the data extracted from the external data sources representing respective values of the factors for calculating the confidence level for a given road event. For example, the mapping platform 109 can query for weather data records from weather service providers (e.g., stored in the weather database 117) based on the time and location of the reported vehicle sensor data. When the road event is related to weather or otherwise can be correlated to weather, the weather data records can be used to determine weather-related road conditions (e.g., dry roads, wet roads, icy roads, etc.) at the road segment or area of interest 105. The road conditions derived from the weather data can then be used to calculate a confidence level of the road event. For example, when the road event is a slippery road event, the weather data records can be correlated to the slippery road event when a weather event (e.g., rain) occurs at a proximate location and time of the vehicle sensors reports to increase the level of confidence of the detected event.

Similarly, one or more of the other data sources can be used to determine additional factors. For example, the vehicle database 121 can include information identifying the type and/or specification of the vehicles 101 and/or sensors 103 submitting the vehicle sensor reports. This vehicle data can be used to estimate a quality of the reporting source or vehicle 101. In this case, higher quality vehicles 101 and/or sensors 103 can be used to indicate a higher confidence level for the road events they report. In one embodiment, the geographic database 119 can be used to map match the vehicle sensor reports and/or detected road event to a corresponding link, map tile, or other map location. The map matching results, for instance, can be used to determine how close or far the vehicle sensor reports are from features where driver behavior may result to vehicle sensor reports that may incorrectly indicate slippery conditions. For example, A vehicle 101 approaching or leaving an intersection may generate sensor reports that appear to indicate slippery conditions as the vehicle decelerates or accelerates to or from such an intersection. Accordingly, vehicle sensor reports near intersections or other map features of the geographic database 119 where a vehicle 101 is more likely to accelerate or decelerate (e.g., curves, junctions, ramps, etc.) may be associated with lower confidence levels. In one embodiment, the mapping platform 109 can indicate in the confidence data structure 205 whether a vehicle sensor report is within a threshold distance of an intersection or similar feature of the geographic database 119 to be considered as a factor in determining the road event confidence 201.

In one embodiment, these factors, map matching results, and/or other related data can be stored in the confidence data structure 205. The mapping platform 109 can then process the confidence data structure 205 to calculate the road event confidence 201 for the road event corresponding to the vehicle sensor data reports. The various embodiments described below provide additional details of the process for the generating the road event confidence 201 and then transmitting and/or otherwise acting on a road event message based on the calculated confidence 201.

Figure 3:
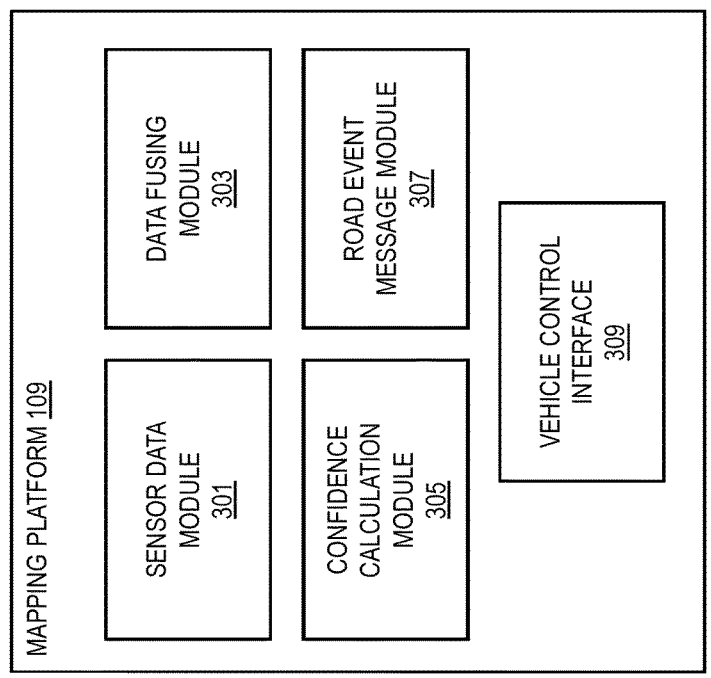
FIG. 3 is a diagram of the components of a mapping platform capable of providing a confidence-based road event message, according to one embodiment.

FIG. 3 is a diagram of the components of a mapping platform capable of providing a confidence-based road event message, according to one embodiment. By way of example, the mapping platform 109 includes one or more components for providing a confidence-based road event message according to the various embodiments described herein. It is contemplated that the functions of these components may be combined or performed by other components of equivalent functionality. In this embodiment, the mapping platform 109 includes vehicle sensor data module 301, data fusing module 303, confidence calculation module 305, road event message module 307, and a vehicle control interface 309. The above presented modules and components of the mapping platform 109 can be implemented in hardware, firmware, software, or a combination thereof. Though depicted as a separate entity in FIG. 1, it is contemplated that the mapping platform 109 may be implemented as a module of any of the components of the system 100 (e.g., a component of the services platform 111, services 115, vehicle 101, client terminal 113, etc.). In another embodiment, one or more of the modules 301-309 may be implemented as a cloud based service, local service, native application, or combination thereof. The functions of the mapping platform 109 and the modules 301-309 are discussed with respect to FIG. 4 below.

Figure 4:
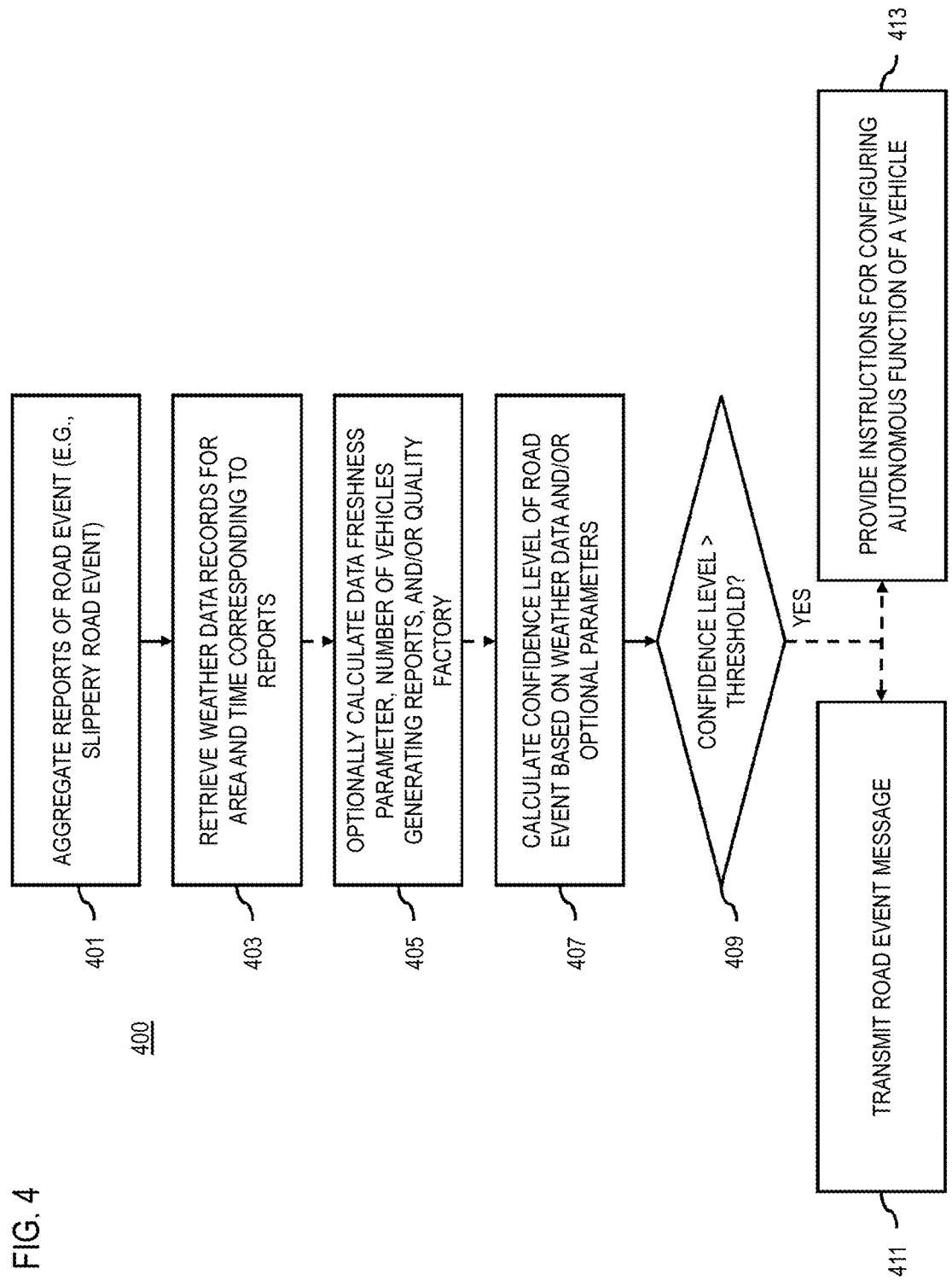
FIG. 4 is a flowchart of a process for providing a confidence-based road event message, according to one embodiment.
Figure 9:
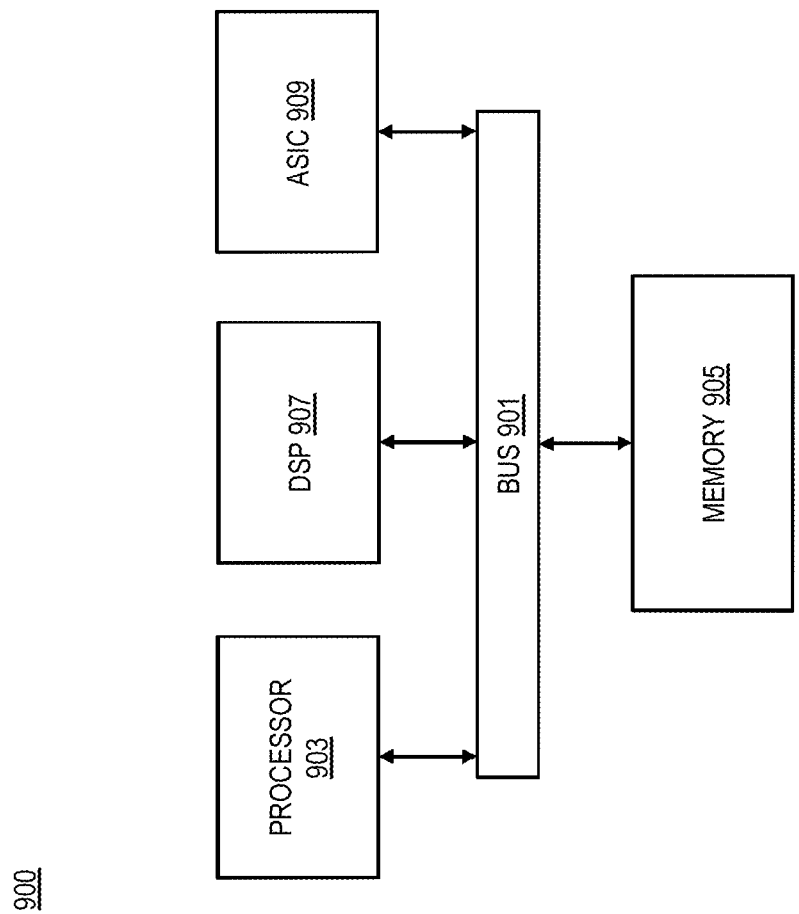
FIG. 9 is a diagram of a chip set that can be used to implement an embodiment of the invention, according to one embodiment.

FIG. 4 is a flowchart of a process for providing a confidence-based road event message, according to one embodiment. In various embodiments, the mapping platform 109 and/or any of the modules 301-309 of the mapping platform 109 as shown in FIG. 3 may perform one or more portions of the process 300 and may be implemented in, for instance, a chip set including a processor and a memory as shown in FIG. 9. As such, the mapping platform 109 and/or the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In step 401, the sensor data module 301 aggregates one or more reports of a road event (e.g., slippery road event) reported from one or more vehicles traveling in an area of interest. To support real-time or near real-time monitoring of road events, the vehicle sensor reports are generated and transmitted to the sensor data module 301 within a short period of time after the data is collected (e.g., often within minutes or within a currently defined time epoch). By way of example, the one or more road event reports are based on sensor data collected from one or more sensors 103 of the one or more vehicles 101. In one embodiment, the vehicles 101 can use any combination of its onboard sensors 103 to detect a road event. With respect to a slippery road event (e.g., an event in which friction between the road surface and the vehicle 101's tires are reduced), the vehicle 101 can use, for instance, a combination of wheel speed sensors, accelerometers, steering wheel angle sensor, body roll sensors, and/or the like to sense conditions associated with a slippery road event. It is contemplated that any combination of sensors 103 and related algorithm for detecting the slippery road event or other road event can be used with the embodiments described herein. Other road events may be detected and included in the vehicle sensor data reports based on different combinations of sensors 103 and detection algorithm. For example, a precipitation event can be detected based on windshield wiper activation sensors. Similarly, a visibility event can be detected based on a camera or light sensors.

In many cases, because of the variety of available sensors 103 and vehicles 101, different vehicle types and/or manufacturers can use different combinations of sensors 103 and/or algorithms for detecting and reporting a road event to the mapping platform 109. For example, accelerometers can be used to sense the acceleration or deceleration rates of a vehicle for a first manufacturer. Then if the sensed rates are outside a specific threshold window, a slippery road event or other similar road event can be inferred. In contrast, another vehicle manufacturer may use wheel speed or rotation sensors to detect the same slippery road event.

In one embodiment, the vehicle sensor data report from the vehicles 101 can include at least: (1) the road event detected from the vehicle 101's sensor data (e.g., a slipper road event); (2) a location of the detected road event (e.g., in coordinates such as latitude, longitude, and altitude if available); and (3) a time of the detected road event (e.g., in Coordinated Universal Time (UTC) or equivalent). In addition or alternatively to the identification of the detected road event, the vehicle sensor data reports can include the underlying raw sensor data. In this way, the sensor data module 301 can process the sensor data in the report to independently determine or confirm the detected road event.

In one embodiment, the one or more reports of the slippery road event are aggregated from the area of interest based on a predetermined time epoch. In other words, the sensor data module 301 aggregates vehicle sensor data reports of a road event according to both area and time. For example, the sensor data can segment a road into 50 meter segments (or other distance/area threshold) and then aggregate vehicle sensor data reports from each segment or area of interest according to time epochs (e.g., 15-30 min) epochs. In one embodiment, for real-time or near real-time reporting, a specified number of the most current time epochs can be evaluated to detect road events for confidence calculation according to the various embodiments described herein.

As described above, in one embodiment, the mapping platform 109 can enhance detected road events by fusing the aggregated data vehicle sensor data reports with external data source providing data for determining factors to calculate a confidence level for the detected road event. These factors include, but are not limited to, any combination of: (1) weather data, (2) data freshness, (3) number of vehicles 101 reporting the road event, and (4) quality of data sources. Steps 403 and 405 describe example embodiments of the mapping platform 109 configured to determine and fuse confidence factor data with the vehicle sensor data reports.

In step 403, the data fusing module 303 retrieves weather data records for the area of interest for a time period corresponding to the one or more reports. In one embodiment, the data fusing module 303 extracts the location of the reported road event from the vehicle sensor data reports. The location is then used to query the weather database 117 or other third-party/external weather service providers for the corresponding weather data. In scenarios where no weather station based data is available for a requested location, weather data can be interpolated from nearby weather stations. Weather data is used as a confidence factor because, because in many instances, weather can be correlated with many different types of road events (e.g., a slippery road event, a precipitation event on the road, a visibility event on the road, etc.). Accordingly, weather data collected and/or reported independently of the aggregated vehicle sensor data reports can be used to calculate a confidence level of a road event detected from the sensor data reports.

In one embodiment, the data fusing module 303 uses weather data as a proxy for assessing the conditions of a corresponding roadway. This proxy enables calculation of a confidence level of the detected road event because it is derived from a data source (e.g., third-party weather service providers) separate from the vehicles 101 themselves. Accordingly, the data fusing module 303 calculates a road condition level based on the weather data records.

In one embodiment, the road condition level includes a slippery level of a roadway in the area of interest. To determine road condition levels, the data fusing module 303 determines an air temperature parameter, a precipitation intensity parameter, a visibility parameter, or a combination thereof from the weather data records. The road condition level is based on the air temperature parameter, the precipitation intensity parameter, the visibility parameter, or a combination thereof. For example, the pavement conditions (e.g., dry, damp, wet, snow, frost, ice, etc.) are estimated from the weather parameters of the weather data records (e.g., pavement temperature and estimated water film depth). It is contemplated that short term, third party weather conditions from any weather service provider (e.g., the services platform 111 and/or services 115 that maintain the weather database 117). The weather services can provide an application programming interface (API) to the data fusing module 303 to retrieve the weather data records for the locations and times corresponding to the vehicle sensor data reports. Using the API, the data fusing module 303 can determine a proxy to the pavement conditions and slippery severity of the road segment or area of interest to calculate a confidence level for detected road event.

In one embodiment according to the example described below in Table 1, the data fusing module 303 uses air temperature and precipitation intensity in the last X hours to determine the proxy to the pavement conditions (e.g., the slippery level of the road segment).

TABLE 1

| Air Temperature (C.) | Precipitation Intensity in Last X Hours | Slippery Severity Level | Assigned Weight |
|---|---|---|---|
| >0 | =0 | Not Slippery [Dry] | No Weight |
| <2 | =0 (but visibility < 9 miles) | Slippery Level 0 [Frost] | 0.1 |
| >0 | >0 and < T1 | Slippery Level 1 [Damp] | 0.2 |
| >0 | >= T1 | Slippery Level 2 [Wet] | 0.4 |
| <=0 | >0 | Slippery Level 3 [Icy] | 0.6 |

In one embodiment, Ti as listed in Table 1 is a configurable threshold on precipitation intensity that distinguishes between light and heavy rain which contribute to damp or wet pavement. This value can be set so that the predicted slippery level matches observed ground truth data. In addition or alternatively (e.g., when ground truth data is not available), the data fusing module 303 can specify a default value for Ti such as 0.3 inches (0.76 cm) per hour.

In the example of Table 1, the data fusing module 303 provides for criteria for classifying a road segment into any of five road condition levels (e.g., dry, frost, damp, wet, and icy). For example, weather data retrieved for a road segment or area of interest corresponding to a detected road event indicates that precipitation intensity >=Ti and air temperature >0, then the road segment or area of interest can be assigned a slippery level=2. In one embodiment, the road condition levels determined from the weather data records can be treated as slippery weight values (e.g., third party data weight value) that can be fused with a confidence factor generated using the vehicle sensor data reports without any fused data to calculate a confidence level for the detected road event. In other words, the data fusing module 303 determines a road condition weighting factor based on the road condition level, wherein the confidence level is further based on the road condition weighting factor.

The weights assigned to each road condition level (e.g., slippery level as shown in Table 1) can be adjusted so that the predicted confidence match ground truth data for slippery conditions. In some embodiments, the data fusing module 303 can apply negative weights for road condition levels that have negative correlation to slippery. For example, if weather data indicate that a road segment is likely to be dry, the data fusing module 303 can specify a negative weight (−0.2) in place of having no weight as shown in Table 1.

An example process for fusing the weights for slippery levels (or other road condition levels) inferred from weather data with vehicle sensor data reports is represented in the equation below:

Weather Confidence Factor=$(1-W_{Weather})$ where $W_{Weather}$ is the road condition weighting factor calculated from weather data records as described above. By of example, the road condition weighting factor can then be fused with the confidence level calculated from just the vehicle sensor data reports according to the following:

Confidence=$1-(1-\text{Sensor Data Confidence Factor})\times(1-W_{Weather})$ where the Sensor Data Confidence Factor is a confidence factor calculated from just the vehicle sensor data reports (see step 405 below for examples of calculating such a factor.

For example, if Sensor Data Confidence Factor=0.8 and $W_{Weather}$=0.6 (i.e., weather data records indicate that the road segment or area of interest is icy according to Table 1), the confidence level for the road event detected for the road segment can be calculated as follows:

Confidence based on weather fusion=$1-(1-0.8)\times(1-0.6)=0.92$

Confidence not based on weather fusion=$1-(1-0.8)=0.80$

In the example above, the confidence calculations are for a detected slippery road event. When calculating a confidence based solely on the vehicle sensor data reports with no fused data records from external sources (e.g., determining confidence based on how many vehicles 101 report a given road event), the confidence is 0.80. Because the weather data indicate icy weather conditions that correlate well to slippery road events, the confidence of the detected slippery road event is increased to 0.92. In contrast, if the weather data had indicated that the pavement condition is dry, the confidence based on the confidence would be the confidence from the vehicle sensor data reports only when using the weights indicated in Table 1 (e.g., no weight for dry road conditions). If a negative weight is applied to dry conditions (e.g., when a negative correlation between dry conditions and slippery road events is expected), then the confidence level would decrease when accounting for weather data (e.g., reflecting a general observation that slippery roads are less likely to occur when weather data indicates that the road is likely to be dry).

In step 405, the data fusing module 303 optionally calculates additional confidence factors such as the number vehicles reporting the road event, data freshness, and/or the quality of data sources. The number vehicles reporting the road event and the data freshness are examples of confidence factors that can be calculated directly from the vehicle sensor data reports without fusing additional external or third-party data (e.g., the Sensor Data Confidence Factor described above in step 403).

In one embodiment, the data fusing module 303 optionally determines a number of the one or more vehicles generating the one or more reports. This number can be used to account for increased confidence of multiple vehicles reporting a given road event. In other words, the confidence level of a road event increases as more vehicles 101 report the same road event in the same road segment or area of interest within the same time epoch. slippery roads construct an overall confidence:

$$\text{Confidence} = 1 - \prod_{i=1}^{N} (1 - x \times W_i)^y$$

where x and y are configurable parameters controlling the details of the confidence dependent on individual vehicle weights TW for N number of vehicles 101. In one embodiment, the values of x and y can be determined by varying the values so that the predicted confidence correlates with ground truth data about road events. For example, with x=y=1 and $W_1$=0.8 and $W_2$=0.6, the confidence for an associated road event is calculated as follows:

Confidence=1−(1−0.8)×(1−0.6)=0.92

Based on the above process, confidence of a detected road event increases with more vehicles 101 reporting the road event.

In one embodiment, $W_i$ can be default values or individually calculated based on additional confidence factors such as data freshness and quality factors as described in more detail below. For example, the data fusing module 303 can calculate a data freshness parameter for the one or more vehicle sensor data reports based on an age of each of the one or more reports. In one embodiment, to account for data freshness, the data fusing module 303 assigns each vehicle sensor data report of the road event a time dependent weight:

$$W_{Time}=1-e^{-t0/t}$$

where t is the age of the vehicle sensor data report (e.g., difference between current time and time of issuance of the report) and to is a configurable parameter that controls how fast the weight drops with age of vehicle sensor data report. In one embodiment, the weight of an individual vehicle (e.g., W) can be based on the data freshness of the vehicle sensor data report that it submitted as follows:

$$W_i=W_{Time}$$

In one embodiment, the data fusing module 303 optionally determines a quality factor associated with the one or more vehicles, a vehicle type of the one or more vehicles, a manufacturer of the one or more vehicles, or a combination thereof. For example, to account for potentially different quality of the vehicle sensor data reports received from different vehicles 101, the data fusing module 303 can determine a quality factor Q for each different vehicle 101, vehicle type, sensor 103, sensor types, vehicle manufacturer, vehicle model, etc. In one embodiment, the quality factor Q can be based on any combination of the features or characteristics of the vehicle 101 and/or sensors 103 stored in the vehicle specification database 121. Accordingly, the data fusing module 303 can retrieve data for determining the quality factor Q from the vehicle specification database 121. In one embodiment, the quality factor Q can be normalized to a value of one. In addition or alternatively, a default value for Q can be used (e.g., 1) when the vehicle specification data is unavailable or otherwise not used.

In one embodiment, the quality factor Q can be used alone or in combination with other factors such as data freshness to determine the individual weight $W_i$ for each vehicle 101. In other words, the equation for calculating the individual weight $W_i$ can be the following when based on the quality factor Q alone:

$$W_i=Q$$

In embodiments where the individual weight $W_i$ is based on a combination of factors such as quality and data freshness, the equation for $W_i$ is as follows:

$$W_i=W_{Time} \times Q$$

In one embodiment, the data fusing module 303 can determine one or more inferred negative reports of the road event. The confidence level is further based on the one or more inferred negative reports. By way of example, getting "inferred negative reports" of a road event (e.g., slippery road event) from the vehicles 101 does not mean that a vehicle 101 has to explicitly send a vehicle sensor data report indicating a lack of observations of a given road event. It is enough if each vehicle sensor data report contains information regarding the ability of the vehicle to sense and report a road event but has not done so. In this scenario, the vehicle sensor data report need not be reported to the sensor data module 301 for the express purpose of detecting a road event of interest (e.g., slippery road event). Instead, the report may be sent to the sensor data module 301 or mapping platform 109 for some other reason, such as sign observation, parking event, etc. In other words, a report from a vehicle 101 that is equipped to sense and report a road event of interest on a road segment or area of interest at a time epoch of interest but never does, is equivalent to providing a negative observation of the road event of interest (i.e., an inferred negative report of a road event).

In one embodiment, the approach of using inferred negative reports of a road event is the same for other vehicle sensor data reports for the road event. For example, vehicle sensor data reports can be potentially transmitted to the mapping platform 109 for any number of reasons. Accordingly, sensor data reports received at the mapping platform 109 can include the reporting vehicle 101's capabilities with respect to sensing road events of interest such as, but not limited, to: traffic sign recognition (TSR) events, vehicle speed sensor (VSS) events, parking events, slippery road events, precipitation events, detection of physical dividers, etc. Since the vehicle 101 has the capability to report these events, whenever the vehicle does not report an event, the sensor data module 301 can infer that the event did not occur and it can be used as a negative observation by the sensor data module 301.

For example, say that in a certain area, there are three slippery road events (or vehicle sensor data reports indicating the slippery road events) reported by three different vehicles 101. It may seem reasonable to report a slippery situation. However, when including inferred negative reports from the same area and time window, 100 vehicles (capable of reporting slippery roads) passed by without reporting any slippery events. This additional data can potentially result in decreasing the confidence of that the slippery road event is detected in that area and at that time. In one embodiment, to account for inferred negative reports, the data fusing module 303 can calculate a negative reporting confidence factor as follows:

Negative Reporting Factor=$R_{Explicit}/R_{Total}$ wherein $R_{Explicit}$ is the number of vehicle sensor data reports that explicitly report a road event, and $R_{Total}$ is the total number or reports including both $R_{Explicit}$ and the number of inferred reports in an area of interest at a time of interest ($R_{Inferred}$). When fused with a confidence level, the negative reporting factor decreases as the ratio of $R_{Explicit}$ to $R_{Total}$ decreases.

In step 407, the confidence calculation module 305 calculates a confidence level for a road event based on any combination of the confidence factors determined by the data fusing module 303. As described above, these confidence factors include, but are not limited to, weather data records, the data freshness parameter, the number of the one or more vehicles, inferred negative reports, proximity to intersections or other features with potential false positive slippery road reports, etc. For example, one approach to calculating a confidence level of a detected road event can begin by using the number of reporting vehicles 101 to calculate a baseline confidence level using the equation for number of reporting vehicles described above with the individual weights Wi of each report or vehicle 101 set to 1, as shown below:

Confidence=$1-\Pi_{i=1}^{N}(1-x \times W_i)^y$ where $W_i=1$ simplifying to:

$$\text{Confidence} = 1 - \prod_{i=1}^{N} (1-x)^y$$

In one embodiment, to account for data freshness, the confidence calculation module 305 can set $W_i$ equal to the data freshness factor (e.g., $W_{Time}$ as described above) so that the baseline confidence equation is augmented as follows:

Confidence=$1-\Pi_{i=1}^{N}(1-x \times W_{Time})^y$ where $W_{Time}=1-e^{-\rho/t}$ In one embodiment, to account for the quality of data sources, the confidence calculation module 305 can set $W_i$ equal to the quality factor Q described above so that the baseline confidence equation is augmented as follows:

$$\text{Confidence} = 1 - \prod_{i=1}^{N} (1-x \times Q)^y$$

In one embodiment, to account for both data freshness and quality at the same time, the confidence calculation module 305 can set $W_i$ equal to a product of the data freshness factor and the quality factor so that the baseline confidence equation is augmented as follows:

$$\text{Confidence} = 1 - \prod_{i=1}^{N} (1-x \times W_i)^y \text{ where } W_i = W_{Time} \times Q$$

In one embodiment, to account for weather data from external or third-party sources, the confidence calculation module 305 can augment the baseline confidence equation to fuse the weather data factor as follows:

$$\text{Confidence} = 1 - \prod_{i=1}^{N} (1-x \times W_i)^y \times (1 - W_{Weather})$$

To account for additional confidence factors (e.g., data freshness, quality) in combination with the weather data factor, the confidence calculation module 305 can substitute any of the permutations of $W_i$ described in the above equations.

After selecting a combination of the confidence factors (e.g., configurable by an end user) and the corresponding equation for calculating the confidence level for the detected road event, the confidence calculation module 305 can retrieve the confidence data structure 205 containing the fused data corresponding to the vehicle sensor reports and road event of interest. The confidence level for the detected road event is then calculated using the retrieved confidence data structure 205 and the corresponding confidence equation.

In one embodiment, the calculated confidence level enables the mapping platform 109 and/or other components of the system 100 (e.g., services platform 111, services 115, etc.) to further evaluate the road event to initiate further actions. For example, in step 409, the confidence calculation module 305 determines whether the calculated confidence level is above a configurable threshold level. When the confidence level is above the threshold level, the road event message module 307 can generate and transmit message indicating the detection of the road event for the road segment or area of interest (step 411). The road event message can be part of system (e.g., the mapping platform 109) for providing real-time or near real-time data on conditions of a road or transportation network. For example, the road event message can identify the specific road event (e.g., slippery road event) and affected road segment or area. In one embodiment, the message may also include the calculated confidence level as well as a time-to-live or expiration parameter. In other embodiments, the message does not have a set expiration time and remains effective for the road segment or area until canceled in a subsequent road event message.

Figure 5:
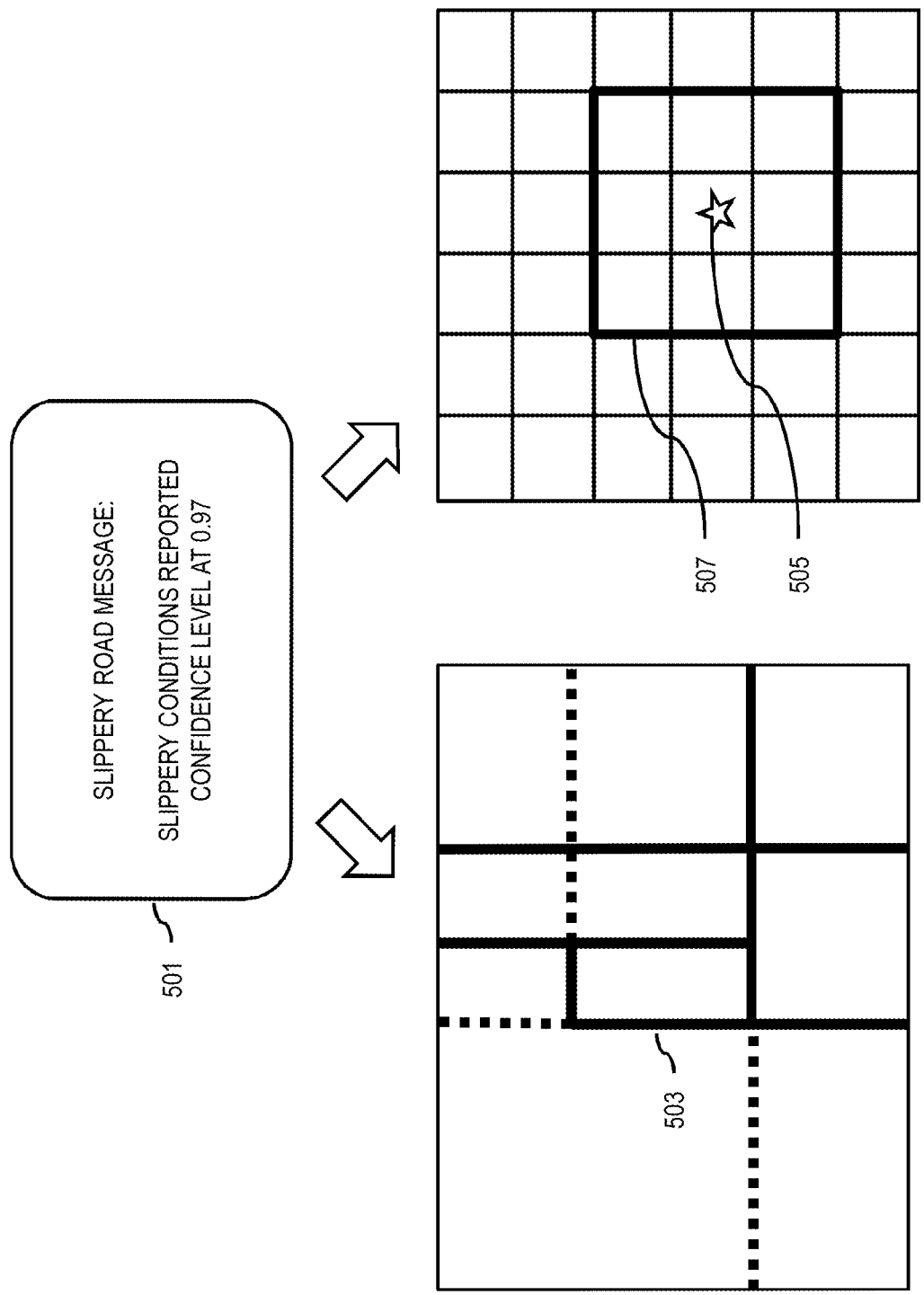
FIG. 5 is a diagram illustrating an example of mapping of a road event message to a road link or a map tile based on a confidence level, according to one embodiment.

As shown in the example of FIG. 5, a road event message 501 may be transmitted to indicate a slippery road event based on its calculated confidence level (e.g. 0.97) that exceeds the configurable action threshold value. This message can be linked to a corresponding road segment or area of interest based on an identified road link, map tile, or other map representation structure (e.g., polygon surface contours of a high resolution three-dimensional map). For example, in one embodiment, the road event message module 307 determines one or more links of a geographic database associated with the slippery road event. This determination can be made by map-matching the location associated with the detected road event and/or vehicle sensor data reports against the links 503 stored, for instance, in the geographic database 119. The road event message (e.g., slippery road event message) is then transmitted for the determined one or more links.

In one embodiment, the road event message module 307 determines a map tile 505 associated with the one or more reports, one or more other map tiles 507 within a distance threshold of the map tile (e.g., surrounding map tiles 507), or a combination thereof. The road event message is then transmitted for the map tile 505, the one or more other map tiles 507, or a combination thereof. In one embodiment, the map tile 505 and/or surrounding map tiles 507 are part of a tile-based map representation of the geographic database 119 with configurable tile sizes at different zoom levels. To transmit a road event message under this tile-based approach, the road event message module 307 considers only tiles where vehicle sensor data reports were received along with surrounding tiles up to a configurable radius. The tiles within the radius represent the area of interest 105 from which vehicle sensor data reports are aggregated to detect road events.

In one embodiment, for each tile in the area of interest 105, the confidence calculation module 305 can calculate a slippery weight based on the time (timeWeight) and distance (distWeight) of the surrounding vehicle sensor data reports of the road event as follows:

$$distWeight = 1 - e^{-\frac{d}{distanceFromReferencePoint}}$$
$$timeWeight = 1 - e^{-t/ageOfReport}$$

The weight for a single vehicle i (e.g., $W_i$) can then be calculated as follows:

$$W_i = distWeight * timeWeight * Q$$

where Q is the quality factor as discussed above.

The total confidence can then be calculated as follows:

$$confidence = 1 - \prod_{i=1}^{N} (1 - C_i)^y$$

where $C_i = x * W_i$ and x and y are configurable parameters that govern the dependence of the total confidence on the individual vehicle weights. In one embodiment, the confidence is built such that the more vehicles report the slippery event, the closer the confidence is to 1. Tiles with confidence above a configurable threshold are sent out as having a detected road event (e.g., being a slippery area when the road event is a slippery road event).

In one embodiment, the same procedure can be applied to road segments along links instead of tiles.

In addition to or instead of transmitting a road event message when the confidence level is above the threshold level, the vehicle control interface 309 optionally provides instructions for configuring an autonomous function of a vehicle based on the confidence level (step 413). In addition or alternatively, the road event message may include or be a road event notification. In one embodiment, the road event notification may be an autonomous function instruction for the area of interest, a specific vehicle located in the area of interest, or a combination thereof. When the notification is directed to the area of interest, the road event notification (e.g., the autonomous vehicle function instruction) can apply to all vehicles operating or located within the area of interest. When the notification is directed to a specific vehicle or group of vehicles (e.g., by vehicle type such), the corresponding autonomous function instruction applies only to the specified vehicle and/or group of vehicles. In one embodiment, the vehicle control interface 309 can be transmitted to a vehicle manufacturer or OEM cloud service to relay the instructions to the area of interest or specific vehicles. In other embodiments, the vehicle control interface 309 can directly transmit or interface with the vehicles 101 in the area of interest to provide the instructions for configuring autonomous functions of the vehicles 101.

For example, when certain road events (e.g., slippery road events) are reported for a road segment or area of interest above a confidence threshold and the event can adversely affect the ability of a vehicle 101 to operate autonomously, the vehicle control interface 309 can provide instructions for changing or activating an operational configuration of the vehicle to disable/enable autonomous driving modes. By way of example, an operational configuration may pertain to a driving mode such as a manual driving mode or an autonomous mode of the vehicle 101. Autonomous vehicles, for instance, are able to drive themselves without the input of vehicle passengers or occupants. However, some types of road events such as slippery road events may reduce the reliability of autonomous operation and manual operation of the vehicle 101 may be needed.

Figure 6:
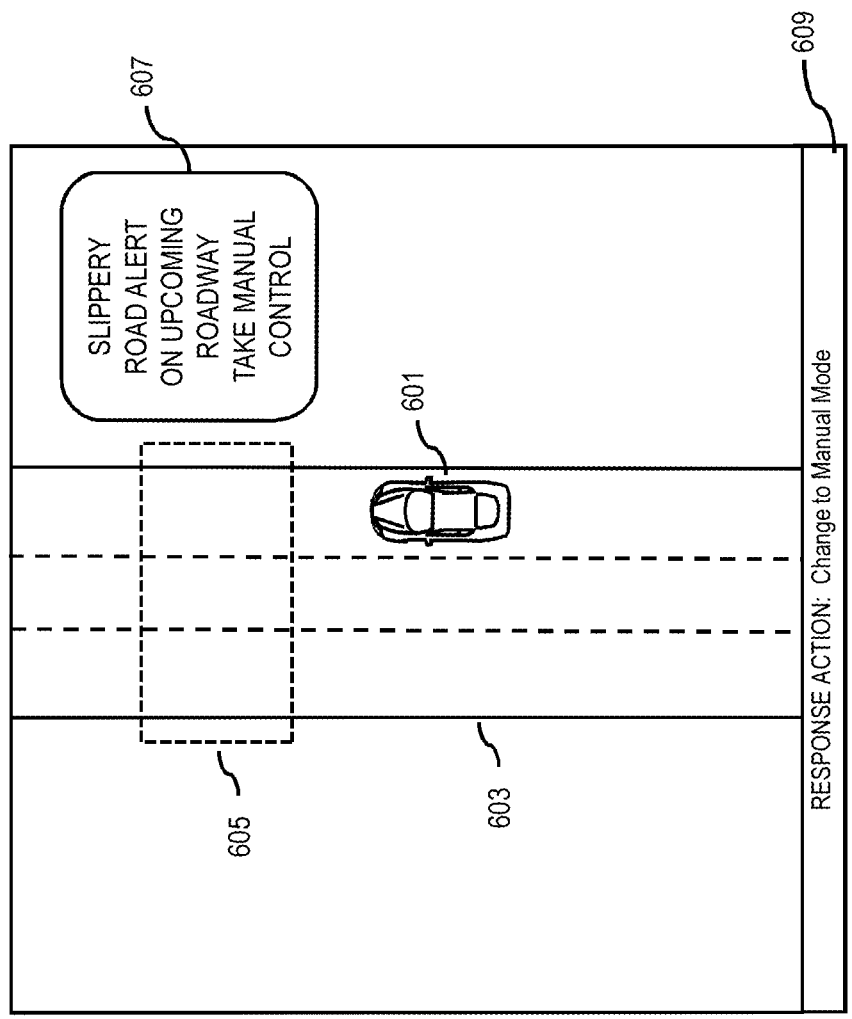
FIG. 6 is a diagram illustrating an example of configuring an autonomous function of a vehicle based on a confidence level, according to one embodiment.

FIG. 6 is a diagram illustrating an example of configuring an autonomous function of a vehicle based on a confidence level, according to one embodiment. In the example FIG. 6, a vehicle 601 is operating in autonomous driving mode on a road 603. Vehicle sensor data reports from other vehicles that have recently traveled on the same road 603 have reported a slippery road event at an upcoming segment 605 of the road at a confidence level (e.g., calculated according to the various embodiments described herein) above a threshold value. In response, the vehicle control interface 309 initiates a presentation of an alert message 607 at the vehicle 601 to informer an occupant/driver of the vehicle 101 that a slippery road event is upcoming and manual control is needed. At the same time or within a predetermined time period of the alert message 607, the vehicle control interface 309 can initiate a response action 609 to change the vehicle 601 from an autonomous driving operational configuration to a manual driving operational configuration.

Returning to FIG. 1, in one embodiment, the vehicles 101 are autonomous, semi-autonomous, or highly assisted driving vehicles that are capable of sensing their environment and navigating within a travel network without driver or occupant input using a variety of sensors 103. The sensors 103 also capable of sensing parameters or characteristics related to the roadway, environment, vehicle dynamics, etc. that can be used to detect or report road events (e.g., slippery road events). The vehicles 101 also have the capability to report detected incident/road events and/or related sensor data to the mapping platform 109 in real-time or near real-time for providing a confidence-based approach to road event detection according to the various embodiments described herein. In one embodiment, the vehicles 101 also have the capability to disable or enable autonomous driving functions in response to road events detected at confidence levels above a threshold value. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

In one embodiment, the various embodiments described herein are applicable to vehicles 101 that are classified in any of the levels of automation (levels 0-4) discussed above. By way of example, the sensors 103 may include any vehicle sensor known in the art including, but not limited to, a Lidar sensor, Radar sensor, infrared sensor, global positioning sensor for gathering location data (e.g., GPS), inertial measurement unit (IMU), network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data about a roadway, an audio recorder for gathering audio data, velocity sensors mounted on steering wheels of the vehicles, vehicle-to-vehicle communication devices or sensors, switch sensors for determining whether one or more vehicle switches are engaged, and the like.

Other examples of the sensors 103 may include light sensors, orientation sensors augmented with height sensors and acceleration sensor (e.g., an accelerometer can measure acceleration and can be used to determine orientation of the vehicle), tilt sensors to detect the degree of incline or decline (e.g., slope) of the vehicle along a path of travel, moisture sensors, pressure sensors, etc. In a further example embodiment, sensors about the perimeter of the vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In yet another embodiment, the sensors can determine the status of various control elements of the car, such as activation of wipers, use of a brake pedal, use of an acceleration pedal, angle of the steering wheel, activation of hazard lights, activation of head lights, etc. In one embodiment, the sensor data can be collected by and/or retrieved from an onboard diagnostic (OBD) or other vehicle telemetry system of the vehicle 101 through an interface or port (e.g., an OBD II interface or equivalent). Any combination of these sensors can be used to detect and report road events.

As previously discussed, in one embodiment, the sensor data can be supplemented with additional information from network-based services such as those provided by a services platform 111 and services 115. By way of example, the services 115 can include weather services, mapping services, navigation services, and/or other data services that provide data for sensing and/or reporting road events such as slippery road events based on road-vehicle friction change associated with a road segment or area of interest. In one embodiment, the services platform 111 and/or the services 115 interact with content providers 125a-125k (also collectively referred to as content providers 125) that provide content data (e.g., weather data, incident reports, vehicle sensor data, map data, imaging data, etc.) to the mapping platform 109, services platform 111, and/or the services 115.

By way of example, the client terminal 113 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a client terminal 113 can support any type of interface to the user (such as "wearable" circuitry, etc.). In addition, the terminal 113 may facilitate various input means for receiving and generating information, including, but not restricted to, a touch screen capability, a keyboard and keypad data entry, a voice-based input mechanism, and the like. Any known and future implementations of the client terminal 113 may also be applicable. In one embodiment, the client terminal 113 can be an embedded component of the vehicle 101 to provide communications capabilities, navigation services, road event sensing and reporting, and/or other related services (e.g., by executing an application 123).

In one embodiment, the vehicle specification database 121 may store records related characteristics and/or attributes of the vehicle 101 and/or its sensors 103 and/or related parts. For example, the vehicle specification database 121 may include, but is not limited to, the following data records: (1) vehicle type data records for storing data identifying the vehicle such as vehicle make, model, year, trim level, vehicle identification number, etc.; (2) sensor type data records for storing data indicating the types, numbers, etc. of sensors 103 or other parts installed in the vehicle 101 corresponding to the vehicle type data record; (3) sensor location data records for storing the locations of the sensors 103 installed on the vehicle 101 (e.g., coordinates of the each sensor location from a reference point on the vehicle 101); and (4) sensor testing data records for storing data on the type, frequency, regulatory requirements, etc. associated with testing the sensors 103 of the vehicle 101, as well as for storing the results of the testing and/or inspection (e.g., image data of the vehicle 101/sensors 103 for damage analysis, emissions testing results, sensor testing results, etc.). In one embodiment, the sensor testing data records can also store the operational parameters or criteria for evaluating the quality of the vehicle 101 and/or sensors 103 with respect to sensing and reporting road events. For example, the criteria or parameters may specify the sampling rates, field of view, resolution, etc. that is to be achieved by a sensor 103 when detecting road events. In one embodiment, the vehicle specification database 121 may be maintained by vehicle manufacturers through an API or another equivalent interface.

In one embodiment, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the mapping platform 109 can interact with the services platform 111 to receive data for determining confidence factors for calculating the confidence level of a detected road event. By way of example, the services platform 111 may include one or more services 115a-115m (also collectively referred to as services 115, e.g., third party weather service providers) for providing weather data (e.g., the weather database 117) used by the system 100 according to various embodiment described herein. The services platform 111 and/or the services 115 can also provide related services such as provisioning services, application services, storage services, mapping services, navigation services, contextual information determination services, location-based services, information-based services (e.g., weather), etc. In one embodiment, the services platform 111 may include or be associated with the weather database 117, the geographic database 119, and/or the vehicle specification database 121.

By way of example, the vehicle 101, mapping platform 109, the services platform 111, and client terminal 115 communicate with each other and other components of the system 100 over the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
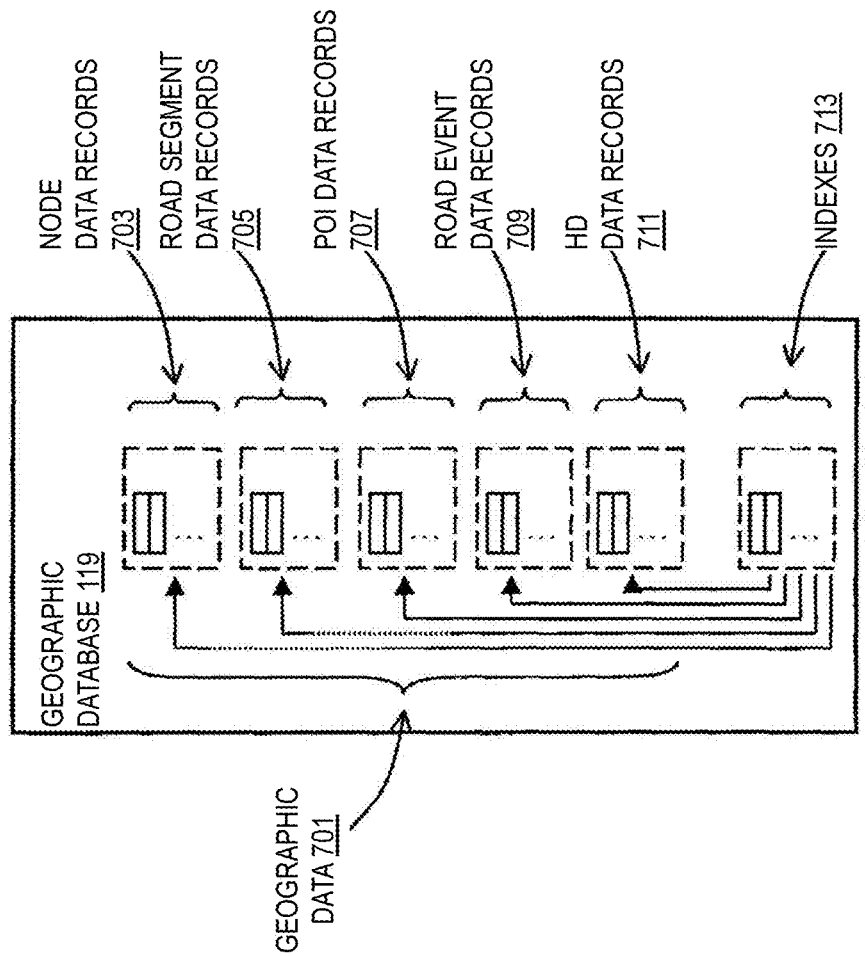
FIG. 7 is a diagram of a geographic database, according to one embodiment.

FIG. 7 is a diagram of a geographic database 119, according to one embodiment. In one embodiment, the geographic database 119 includes geographic data 701 used for (or configured to be compiled to be used for) mapping and/or navigation-related services, such map-matching against reported road events and for storing data records associating road event messages (e.g., slippery event messages) to geographic features such as road segments or map tiles represented in the geographic database 119. In one embodiment, the geographic database 119 include high definition (HD) mapping data that provide centimeter-level or better accuracy of map features. For example, the geographic database 119 can be based on Light Detection and Ranging (LiDAR) or equivalent technology to collect billions of 3D points and model road surfaces and other map features down to the number lanes and their widths. In one embodiment, the HD mapping data (e.g., HD data records 711) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 119.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 119 follows certain conventions. For example, links do not cross themselves and do not cross each other except at a node. Also, there are no duplicated shape points, nodes, or links. Two links that connect each other have a common node. In the geographic database 119, overlapping geographic features are represented by overlapping polygons. When polygons overlap, the boundary of one polygon crosses the boundary of the other polygon. In the geographic database 119, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 119 includes node data records 703, road segment or link data records 705, POI data records 707, road event data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 119. In one embodiment, the indexes 713 may be used to quickly locate data without having to search every row in the geographic database 119 every time it is accessed.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles 101, cars, and/or other entities. Alternatively, the geographic database 119 can contain path segment and node data records or other data that represent pedestrian paths or areas in addition to or instead of the vehicle road record data, for example. In one embodiment, road event data records 709 can be associated with any of the node data records 703 and/or road segment data 705 to indicate that a road event (e.g., a slippery road event) has been detected or reported at a confidence level meeting a configurable threshold for a road segment or area of interest corresponding to the associated node data records 703 and/or road segment records 705.

In addition to road events, the road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 can include data about the POIs and their respective locations in the POI data records 707. The geographic database 119 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 119 can include road event data records 709 containing aggregated vehicle sensor data reports, corresponding confidence data structures 205 (e.g., containing data fused from other sources such as the weather database 117 and/or vehicle specification database 121), calculated confidence levels for the road event, and/or other related data used in the various embodiments described above. In addition, the road event data records 705 can also include data related road event messages or vehicle control signals (e.g., signals generated to disable or enable autonomous vehicle functions in response to detected road events). In one embodiment, the road event data records 709 may be associated as attributes of any of the records 703-707 and 711 of the geographic database 119. In this way, for instance, the road event data records 709 may then be accessed and/or presented via user interfaces of end user devices (e.g., vehicle 101, client terminal 113, etc.).

In one embodiment, as discussed above, the HD mapping data records 711 model road surfaces and other map features to centimeter-level or better accuracy. The HD mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 711 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources). In one embodiment, the road event data records 709 (e.g., including the calculated confidence levels of reported road events) can be associated with the HD mapping data records 711 so that road events and their confidence levels can be localized to the centimeter-level of accuracy of the HD mapping data records 711.

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time road event data, traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like. In one embodiment, these sensor data can be used to report road events and their associated confidence levels determined according to the various embodiments described herein.

In one embodiment, the geographic database 119 can be maintained by the content provider 125 in association with the services platform 111 (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle (e.g., vehicle 101 and/or client terminal 113) along roads throughout the geographic region to observe features and/or record information about them, for example. Also, remote sensing, such as aerial or satellite photography, can be used.

The geographic database 119 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

In one embodiment, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or client terminal 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 119 can be a master geographic database, but in alternate embodiments, the geographic database 1119 can represent a compiled navigation database that can be used in or with end user devices (e.g., vehicle 101, client terminal 113, etc.) to provide navigation-related functions. For example, the geographic database 119 can be used with the end user device to provide an end user with navigation features including road event alerts. In such a case, the geographic database 119 can be downloaded or stored on the end user device (e.g., vehicle 101, client terminal 113, etc.) or the end user device can access the geographic database 119 through a wireless or wired connection (such as via a server and/or the communication network 107), for example. Furthermore, the geographic database 119 or compiled features thereof can be provided as a cloud service.

In one embodiment, the geographic database 119 is presented according to a hierarchical or multi-level tile projection. More specifically, in one embodiment, the geographic database 119 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached. As previously described, the road event data records 709 can be associated with any of the map tiles to indicate that a road event has been detected in the geographic area represented by the map tile.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

In one embodiment, the geographic database 119 may identify a tile by a quadkey determined based on the tile ID of a tile of the map tile grid. The quadkey, for example, is a one dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one dimensional array of the quadkey. In another example, the length of the one dimensional array of the quadkey may indicate the corresponding level within the map tile grid. In one embodiment, the quadkey is an example of the hash or encoding scheme of the respective geographical coordinates of a geographical data point that can be used to identify a tile in which the geographical data point is located.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., client terminal 113) can be a cellular or mobile telephone. An end user can use the device navigation functions such as guidance and map display, for example, and for determination of route information to at least one identified point of interest, according to exemplary embodiments.

The processes described herein for providing a confidence-based road event message may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
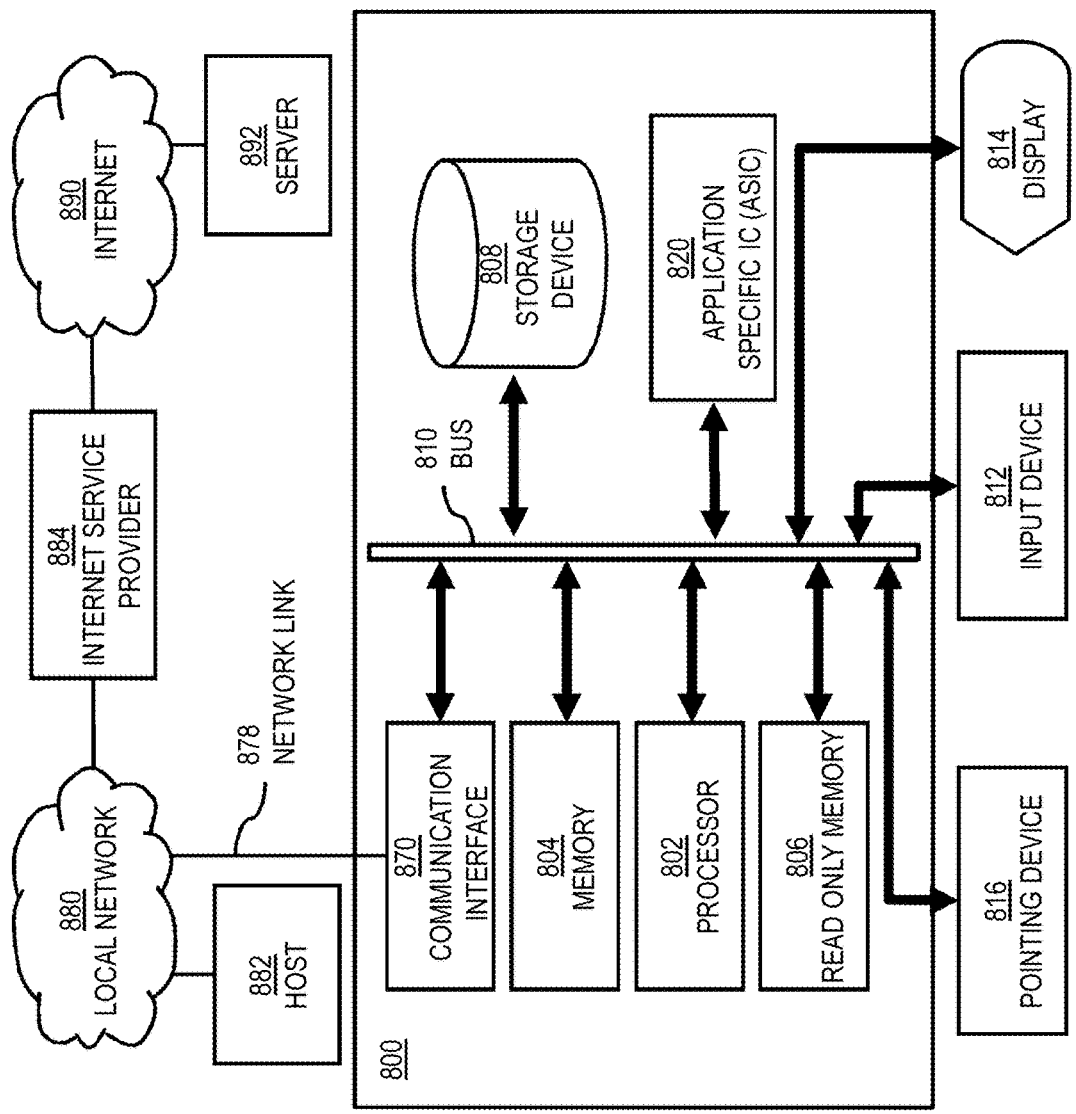
FIG. 8 is a diagram of hardware that can be used to implement an embodiment of the invention, according to one embodiment.

FIG. 8 illustrates a computer system 800 upon which an embodiment of the invention may be implemented. Computer system 800 is programmed (e.g., via computer program code or instructions) to provide a confidence-based road event message as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing a confidence-based road event message. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing a confidence-based road event message. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a confidence-based road event message, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or twoway communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for providing a confidence-based road event message.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide a confidence-based road event message as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a confidence-based road event message. The memory 905 also stores the data associated with or generated by the execution of the inventive steps.

Figure 10:
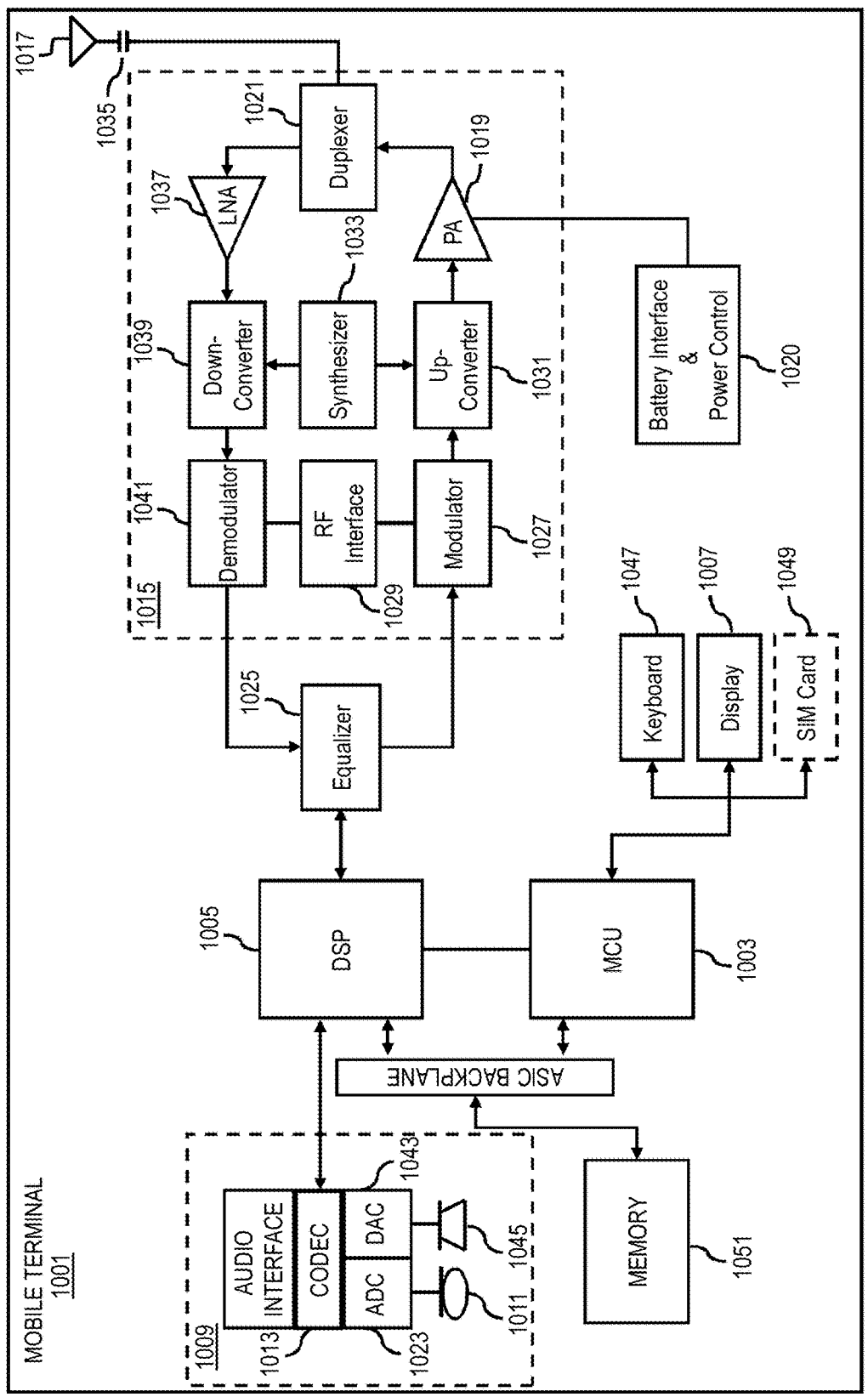
FIG. 10 is a diagram of a mobile terminal (e.g., handset or vehicle or part thereof) that can be used to implement an embodiment of the invention.

FIG. 10 is a diagram of exemplary components of a mobile station 1001 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide a confidence-based road event message. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for transmitting a road event message comprising:

aggregating one or more reports of a road event reported from one or more vehicles traveling in an area of interest;

calculating a data freshness parameter $W_{TIME}$ for the one or more reports based on an equation $$W_{Time} = 1 - e^{-t0/t},$$

wherein t is an age of each of the one or more reports and $t_0$ is a configurable parameter that controls how fast the data freshness parameter decreases with the age;

calculating a confidence level for the road event based, at least in part, on the data freshness parameter; and transmitting the road event message for the area of interest based on the confidence level.

2. The method of claim 1, further comprising:

determining a quality factor associated with the one or more vehicles, a vehicle type of the one or more vehicles, a manufacturer of the one or more vehicles, or a combination thereof, wherein the confidence level is further based on the quality factor.

3. The method of claim 1, further comprising:

retrieving weather data records for the area of interest for a time period corresponding to the one or more reports;

calculating a road condition level based on the weather data records; and determining a road condition weighting factor $W_{Weather}$ based on the road condition level, wherein the confidence level is calculated based on an equation $$\text{Confidence} = 1 - \prod_{i=1}^{N} (1 - x \times W_i)^y \times (1 - W_{Weather}),$$

wherein N is a number of the one or more vehicles, and $W_i$ is a weight for a single vehicle.

4. The method of claim 3 further comprising:
determining an air temperature parameter, a precipitation intensity parameter, a visibility parameter, or a combination thereof from the weather data records,
wherein the road condition level is based on the air temperature parameter, the precipitation intensity parameter, the visibility parameter, or a combination thereof.

5. The method of claim 3, wherein the road condition level includes a slippery level of a roadway in the area of interest, and the method further comprising:
calculating a slippery weight based on time timeWeight and a slippery weight based on distance distWeight of one or more surrounding vehicle sensor data reports of the road event using equations:

$$distWeight = 1 - e^{-\frac{d}{distanceFromReferencePoint}}, \text{ and}$$

$$timeWeight = 1 - e^{-t/ageOfReport}.$$

6. The method of claim 1, further comprising:
determining one or more inferred negative reports of the road event,
wherein the confidence level is further based on the one or more inferred negative reports.

7. The method of claim 2, further comprising:
determining one or more links of a geographic database associated with the road event,
wherein the confidence level is calculated based on a product of the data freshness parameter and the quality factor,
wherein the road event message is transmitted for the determined one or more links, and
wherein $W_i$ is the quality factor for a single vehicle i, and the confidence level is calculated based on an equation $$\text{Confidence} = 1 - \prod_{i=1}^{N} (1 - x \times W_i)^y,$$

wherein N is a number of the one or more vehicles, and x and y correlate with confidence ground truth data associated with the road event.

8. The method of claim 1, further comprising:
determining a map tile associated with the one or more reports, one or more other map tiles within a distance threshold of the map tile, or a combination thereof,
wherein the road event message is transmitted for the map tile, the one or more other map tiles or a combination thereof.

9. The method of claim 5, further comprising:
calculating another weight for a single vehicle $W_{ii}$ based on an equation $$W_{ii} = distWeight * timeWeight * W_i$$

wherein $W_i$ is the quality factor for a single vehicle i, and wherein the one or more reports of the road event are aggregated based on a predetermined time epoch.

10. The method of claim 9, wherein the confidence level is calculated based on an equation $$\text{confidence} = 1 - \prod_{i=1}^{N} (1 - C_i)^y,$$

wherein N is a number of the one or more vehicles, $C_i = x * W_{ii}$, and x and y are configurable parameters that govern dependence of the confidence level on $W_{ii}$, and
wherein the one or more road event reports are based on sensor data collected from one or more sensors of the one or more vehicles.

11. An apparatus for transmitting a road event notification comprising:
at least one processor; and
at least one memory including computer program code for one or more programs,
the at least one memory and the computer program code configured to, with the at least one processor, cause the apparatus to perform at least the following,
determine one or more vehicles traveling in an area of interest that report a road event;
determine a quality factor associated with the one or more vehicles, a vehicle type of the one or more vehicles, a manufacturer of the one or more vehicles, or a combination thereof;
calculate a confidence level for the road event based on an equation $$\text{confidence} = 1 - \prod_{i=1}^{N} (1 - C_i)^y,$$

wherein N is a number of the one or more vehicles, $W_{ii}$ is the quality factor for a single vehicle i, $C_i = x * W_{ii}$, and x and y are configurable parameters that govern dependence of the confidence level on $W_{ii}$; and
transmit the road event notification based on the confidence level.

12. The apparatus of claim 11, wherein the apparatus is further caused to:
calculate a data freshness parameter for the one or more reports of the road event from the one or more vehicles based on an age of each of the one or more reports,
wherein the confidence level is further based on the data freshness parameter.

13. The apparatus of claim 11, wherein the apparatus is further caused to:
calculate a slippery weight based on time timeWeight and a slippery weight based on distance distWeight of one or more surrounding vehicle sensor data reports of the road event using equations:

$$distWeight = 1 - e^{-\frac{d}{distanceFromReferencePoint}}, \text{ and}$$

$$timeWeight = 1 - e^{-t/ageOfReport}.$$

14. The apparatus of claim 13, wherein the apparatus is further caused to:
calculate the weight for a single vehicle $W_{ii}$ based on an equation $$W_{ii} = \text{distWeight} * \text{timeWeight} * W_i$$

wherein $W_i$ is a quality factor associated with the one or more vehicles, a vehicle type of the one or more vehicles, a manufacturer of the one or more vehicles, or a combination thereof.

15. The apparatus of claim 11, wherein the apparatus is further caused to:
determine weather data records for the area of interest for a time period corresponding to one or more reports of the road event from the one or more vehicles; and
determining a road condition weighting factor $W_{Weather}$ based on the weather data records,
wherein the confidence level is calculated further based on a product of the road condition weighting factor $W_{Weather}$ and the quality factor.

16. The apparatus of claim 15, wherein the confidence level for the road event is calculated based on an equation $$\text{Confidence} = 1 - (1 - \text{Quality Factor}) \times (1 - W_{Weather}).$$

17. A non-transitory computer-readable storage medium for configuring an autonomous function of a vehicle based on a slippery road event, carrying one or more sequences of one or more instructions which, when executed by one or more processors, cause an apparatus to perform:
aggregating one or more reports of the slippery road event reported from one or more other vehicles traveling in an area of interest;
determining weather data records for the area of interest for a time period corresponding to the one or more reports;
determining a road condition weighting factor $W_{Weather}$ based on the weather data records;
calculating a confidence level for the slippery road event based on an equation $$\text{Confidence} = 1 - \prod_{i=1}^{N} (1 - x \times W_i)^y \times (1 - W_{Weather}),$$

wherein N is the number of the one or more vehicles, x and y correlate with confidence ground truth data associated with the slippery road event, and $W_i$ is a weight for a single vehicle; and
providing instructions for configuring the autonomous function of the vehicle based on the confidence level.

18. The non-transitory computer-readable storage medium of claim 17, wherein the apparatus is further caused to perform:
determining a quality factor associated with the one or more vehicles, a vehicle type of the one or more vehicles, a manufacturer of the one or more vehicles, or a combination thereof,
wherein the confidence level is calculated further based on a product of the road condition weighting factor $W_{Weather}$ and the quality factor.

19. The non-transitory computer-readable storage medium of claim 17, wherein the apparatus is further caused to perform:
calculating a data freshness parameter for the one or more reports based on an age of each of the one or more reports,
wherein the confidence level is further based on the data freshness parameter.

20. The non-transitory computer-readable storage medium of claim 19, wherein the apparatus is further caused to perform:
determining an air temperature parameter, a precipitation intensity parameter, a visibility parameter, or a combination thereof from the weather data records,
wherein the road condition level is based on the air temperature parameter, the precipitation intensity parameter, the visibility parameter, or a combination thereof.

* * * * *